(12) United States Patent
Ito et al.

(10) Patent No.: US 10,615,467 B2
(45) Date of Patent: Apr. 7, 2020

(54) BATTERY PACK MONITORING SYSTEM

(71) Applicant: Kubota Corporation, Osaka-shi (JP)

(72) Inventors: Hirokazu Ito, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 110 days.

(21) Appl. No.: 16/009,893

(22) Filed: Jun. 15, 2018

(65) Prior Publication Data
US 2019/0020075 A1 Jan. 17, 2019

(30) Foreign Application Priority Data

Jul. 13, 2017 (JP) .................. 2017-136940

(51) Int. Cl.
| | |
|---|---|
| *H01M 4/02* | (2006.01) |
| *H01M 10/48* | (2006.01) |
| *G01K 13/00* | (2006.01) |
| *G01K 1/02* | (2006.01) |
| *G01K 3/00* | (2006.01) |

(Continued)

(52) U.S. Cl.
CPC ............ *H01M 10/486* (2013.01); *B60L 1/00* (2013.01); *B60L 3/0046* (2013.01); *B60L 3/12* (2013.01); *B60L 53/80* (2019.02); *B60L 58/10* (2019.02); *G01K 1/024* (2013.01); *G01K 3/005* (2013.01); *G01K 13/00* (2013.01); *H01M 10/42* (2013.01); *H01M 10/488* (2013.01); *H02J 7/0021* (2013.01); *H02J 7/0047* (2013.01); *H02J 7/027* (2013.01); *H02J 7/047* (2013.01); *B60L 2200/40* (2013.01); *B60L 2240/54* (2013.01); *B60L 2240/545* (2013.01); *B60L 2250/10* (2013.01); *B60L 2250/16* (2013.01); *H01M 2220/20* (2013.01)

(58) Field of Classification Search
CPC ........................................ H01M 4/02
See application file for complete search history.

(56) References Cited

U.S. PATENT DOCUMENTS

| | | |
|---|---|---|
| 2014/0046536 A1 | 2/2014 | Iguchi |
| 2016/0001656 A1 | 1/2016 | Korenaga et al. |
| 2016/0293906 A1 | 10/2016 | Ito et al. |

FOREIGN PATENT DOCUMENTS

| | | | |
|---|---|---|---|
| EP | 2623379 A1 | | 7/2013 |
| FR | 2974653 | * | 11/2012 |

(Continued)

*Primary Examiner* — Jacob B Marks
(74) *Attorney, Agent, or Firm* — The Webb Law Firm

(57) ABSTRACT

A battery pack monitoring system is provided with: a battery pack that includes a battery unit capable of supplying electric power to an electric-powered work vehicle, and can be attached to and detached from the electric-powered work vehicle; a detection mechanism configured to detect the state inside the battery pack or the state of the environment surrounding the battery pack with the battery pack detached from the electric-powered work vehicle; a detection mechanism power supply that is separate from the battery unit, and is capable of supplying electric power to the detection mechanism; a notification signal output unit configured to output a notification signal based on a result of the detection performed by the detection mechanism; and a notification device configured to perform notification based on the notification signal output by the notification signal output unit.

10 Claims, 5 Drawing Sheets

(51) Int. Cl.
*H02J 7/02* (2016.01)
*B60L 58/10* (2019.01)
*B60L 3/00* (2019.01)
*B60L 3/12* (2006.01)
*B60L 53/80* (2019.01)
*H02J 7/00* (2006.01)
*B60L 1/00* (2006.01)
*H01M 10/42* (2006.01)
*H02J 7/04* (2006.01)

(56) References Cited

FOREIGN PATENT DOCUMENTS

| | | |
|---|---|---|
| FR | 2974653 A1 | 11/2012 |
| JP | 2016197502 A | 11/2016 |

* cited by examiner

BATTERY PACK MONITORING SYSTEM

CROSS-REFERENCE TO RELATED APPLICATION

This application claims priority to Japanese Patent Application No. 2017-136940 filed Jul. 13, 2017, the disclosure of which is hereby incorporated in its entirety by reference.

BACKGROUND OF THE INVENTION

Field of the Invention

The present invention relates to a battery pack monitoring system for monitoring a battery pack for use in an electric-powered work vehicle.

Description of Related Art

One known example of a battery pack for use in electric-powered work vehicles is the battery pack disclosed in JP 2016197502A (or corresponding US 2016-0293906A or EP 3076457A1). This battery pack includes a battery unit capable of supplying electric power to an electric-powered work vehicle.

Here, it is conceivable that a battery pack as disclosed in JP 2016197502A (US 2016-0293906A or EP 3076457A1) is configured to be attachable to and detachable from an electric-powered work vehicle. With this configuration, a worker can easily replace the battery pack.

However, if the battery pack detached from the electric-powered work vehicle is stored in a storage area such as a repository for a relatively long period of time, the battery pack may degrade significantly depending on the environment of the storage area.

For example, if the temperature or humidity of the storage area is relatively high, the battery pack is likely to degrade significantly as a result of being stored in this storage area for a relatively long period of time.

If a worker does not know the fact that a battery pack degrades significantly depending on the environment in which the battery pack is stored or is not aware of the actual storage environment being inappropriate, the worker is likely to store the battery pack for a relatively long period of time in an inappropriate storage environment.

Accordingly, there is demand for a battery pack monitoring system that can notify a worker when the environment in which a battery pack is stored is inappropriate.

SUMMARY OF THE INVENTION

In view of the foregoing circumstances, the following invention is proposed.

A battery pack monitoring system includes:

a battery pack that includes a battery unit capable of supplying electric power to an electric-powered work vehicle, and can be attached to and detached from the electric-powered work vehicle;

a detection mechanism configured to detect a state inside the battery pack or a state of an environment surrounding the battery pack with the battery pack detached from the electric-powered work vehicle;

a detection mechanism power supply that is separate from the battery unit, and is capable of supplying electric power to the detection mechanism;

a notification signal output unit configured to output a notification signal based on a result of the detection performed by the detection mechanism; and a notification device configured to perform notification based on the notification signal output by the notification signal output unit.

According to this configuration, it is possible to realize a configuration in which, if the environment in which a battery pack is stored is inappropriate, the detection mechanism detects this fact. Then, notification is made based on the result of the detection performed by the detection mechanism, making it possible to notify a worker of the fact that the environment in which the battery pack is stored is inappropriate.

According to this configuration, therefore, it is possible to realize a battery pack monitoring system that can notify a worker when the environment in which the battery pack is stored is inappropriate.

According to one preferred embodiment, the detection mechanism may include a temperature sensor configured to detect a temperature inside the battery pack or a temperature of the environment surrounding the battery pack, and the notification signal output unit may be configured to output the notification signal based on the temperature detected by the temperature sensor.

If the temperature of the area in which the battery pack is stored is relatively high or relatively low, the battery pack is likely to degrade significantly as a result of being stored in this storage area for a relatively long period of time.

Here, according to the above-described configuration, the temperature sensor detects the temperature inside the battery pack or the temperature of the environment surrounding the battery pack. Then, notification is made based on the temperature detected by the temperature sensor.

According to the above-described configuration, therefore, it is possible to realize a configuration that notifies a worker if the temperature of the area in which the battery pack is stored is relatively high or relatively low.

According to one preferred embodiment, the battery pack monitoring system may further include:

a high temperature determination unit configured to determine, based on the temperature detected by the temperature sensor, whether or not a period in which the temperature inside the battery pack or the temperature of the environment surrounding the battery pack is continuously equal to or greater than a predetermined first temperature has reached a predetermined first period, wherein the notification signal output unit may be configured to output the notification signal if it is determined by the high temperature determination unit that the period in which the temperature inside the battery pack or the temperature of the environment surrounding the battery pack is continuously equal to or greater than the first temperature has reached the first period.

According to this configuration, it is possible to realize a configuration in which the high temperature determination unit determines whether or not the battery pack has been stored in a storage area with a relatively high temperature for a relatively long period of time. Accordingly, if the battery pack has been stored in a storage area with a relatively high temperature for a relatively long period of time, it is possible to notify a worker of this fact.

According to one preferred embodiment, the battery pack monitoring system may further include:

a low temperature determination unit configured to determine, based on the temperature detected by the temperature sensor, whether or not a period in which the temperature inside the battery pack or the temperature of the environment surrounding the battery pack is continuously equal to or lower than a predetermined second temperature has reached a predetermined second period, wherein the notification signal output unit may be configured to output the notification signal if it is determined by the low temperature determination unit that the period in which the temperature inside the battery pack or the temperature of the environment surrounding the battery pack is continuously equal to or lower than the second temperature has reached the second period.

According to this configuration, it is possible to realize a configuration in which the low temperature determination unit determines whether or not the battery pack has been stored in a storage area with a relatively low temperature for a relatively long period of time. Accordingly, if the battery pack has been stored in a storage area with a relatively low temperature for a relatively long period of time, it is possible to notify a worker of this fact.

According to one preferred embodiment, in the battery pack monitoring system, the detection mechanism may include a humidity sensor configured to detect humidity inside the battery pack or humidity of the environment surrounding the battery pack, and the notification signal output unit may be configured to output the notification signal based on the humidity detected by the humidity sensor.

If the humidity of the area in which the battery pack is stored is relatively high, the battery pack is likely to degrade significantly as a result of being stored in this storage area for a relatively long period of time.

Here, according to the above-described configuration, the humidity sensor detects the humidity inside the battery pack or the humidity of the environment surrounding the battery pack. Then, notification is made based on the humidity detected by the humidity sensor.

According to the above-described configuration, therefore, it is possible to realize a configuration that notifies a worker if the humidity of the area in which the battery pack is stored is relatively high.

According to one preferred embodiment, the battery pack monitoring system may further include:

a high humidity determination unit configured to determine, based on the humidity detected by the humidity sensor, whether or not a period in which the humidity inside the battery pack or the humidity of the environment surrounding the battery pack is continuously equal to or greater than a predetermined first humidity has reached a predetermined third period, wherein the notification signal output unit may be configured to output the notification signal if it is determined by the high humidity determination unit that the period in which the humidity inside the battery pack or the humidity of the environment surrounding the battery pack is continuously equal to or greater than the first humidity has reached the third period.

According to this configuration, it is possible to realize a configuration in which the high humidity determination unit determines whether or not the battery pack has been stored in a storage area with a relatively high humidity for a relatively long period of time. Accordingly, if the battery pack has been stored in a storage area with a relatively high humidity for a relatively long period of time, it is possible to notify a worker of this fact.

According to one preferred embodiment, the detection mechanism may be configured to detect a state inside the battery pack or a state of the environment surrounding the battery pack in every predetermined fourth period.

If the detection mechanism continuously performs detection, the detection mechanism will consume a relatively large amount of electric power per unit time. In other words, electric power per unit time that needs to be supplied by the detection mechanism power supply to the detection mechanism will be relatively large. Accordingly, a relatively large detection mechanism power supply needs to be provided. As a result, space necessary for the battery pack monitoring system to be placed may increase.

Here, according to the above-described configuration, the detection is performed by the detection mechanism in every predetermined fourth period. Accordingly, the detection mechanism consumes less electric power per unit time than in a case where the detection is continuously performed by the detection mechanism. In other words, the electric power per unit time that needs to be supplied by the detection mechanism power supply to the detection mechanism is smaller than in the case where the detection is continuously performed by the detection mechanism. Accordingly, even a relatively small detection mechanism power supply can supply a sufficient amount of electric power to the detection mechanism. Accordingly, a relatively small space is needed for the battery pack monitoring system to be placed.

According to one preferred embodiment, the notification device may be a display unit provided on the battery pack.

According to this configuration, when a worker again uses the battery pack that has been stored in an inappropriate storage environment, the worker can be made aware that the battery pack has been stored in an inappropriate storage environment, by viewing the display unit. Accordingly, it is possible to reliably notify a worker of the fact that the battery pack has been stored in an inappropriate storage environment.

According to one preferred embodiment, the notification device may be an on-board monitor included in the electric-powered work vehicle, and upon the battery pack being attached to the electric-powered work vehicle, the on-board monitor performs notification based on the notification signal output by the notification signal output unit.

According to this configuration, when the battery pack that has been stored in an inappropriate storage environment is attached to an electric-powered work vehicle by a worker, the worker can be made aware that the battery pack has been stored in an inappropriate storage environment, by viewing the on-board monitor. Accordingly, it is possible to reliably notify a worker of the fact that the battery pack has been stored in an inappropriate storage environment.

According to one preferred embodiment, the battery pack monitoring system may further include:

a mobile communication terminal capable of performing wireless communication, wherein the mobile communication terminal may include the notification device.

According to this configuration, when a worker is carrying the mobile communication terminal, if it is detected by the detection mechanism that the environment in which the battery pack is stored is inappropriate, the worker can be made aware, via the mobile communication terminal, of the fact that the environment in which the battery pack is stored is inappropriate. Accordingly, it is easy to timely notify a worker of the fact that the environment in which the battery pack is stored is inappropriate.

DESCRIPTION OF THE INVENTION

Figure 1:
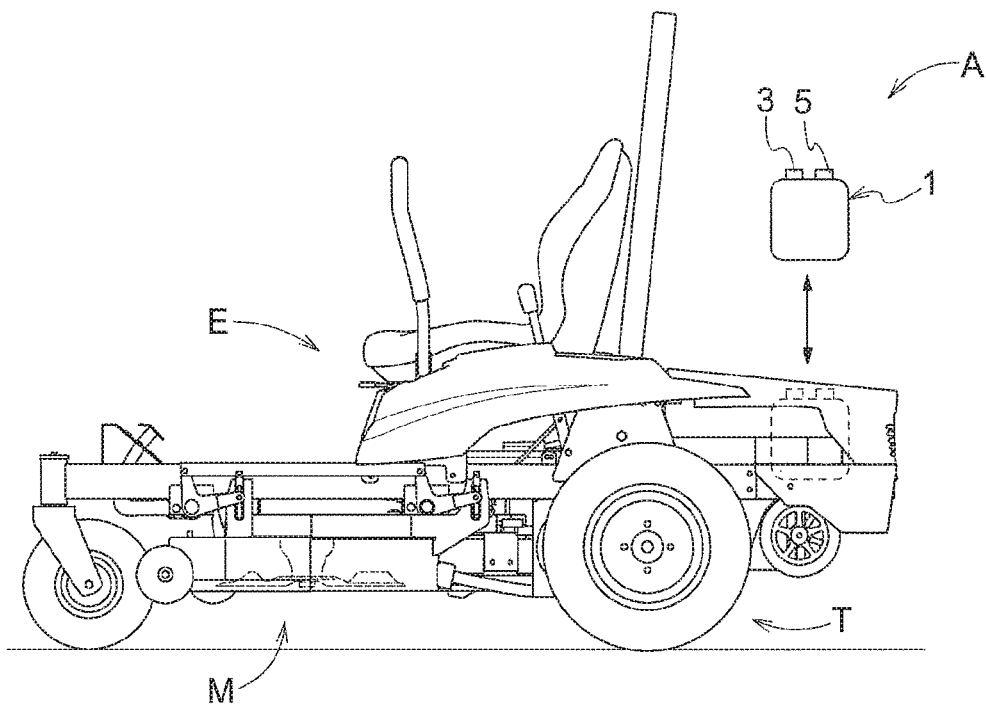
FIG. 1 is an overall view illustrating a battery pack monitoring system.
Figure 2:
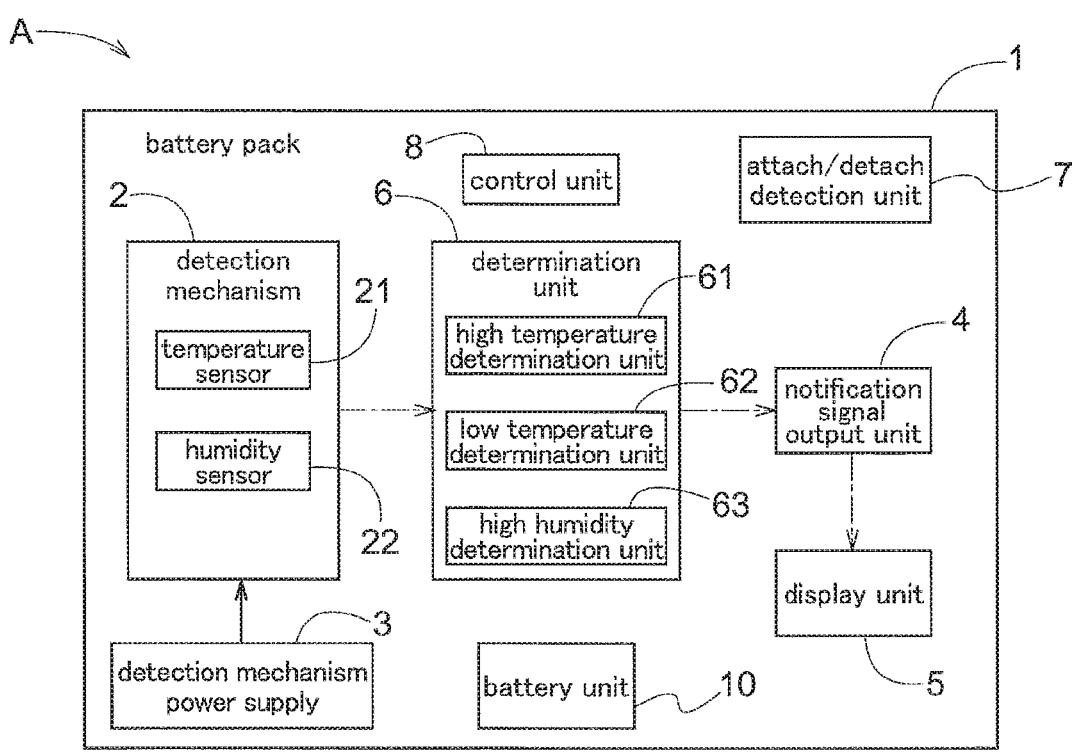
FIG. 2 is a block diagram illustrating a configuration of the battery pack monitoring system.

Hereinafter, embodiments for implementing the present invention will be described with reference to the drawings.
Overall Configuration of Battery Pack Monitoring System As shown in FIGS. 1 and 2, a battery pack monitoring system A includes a battery pack 1. The battery pack 1 includes: a detection mechanism 2; a detection mechanism power supply 3; a notification signal output unit 4; a display unit 5 (corresponding to a "notification device" according to the present invention); a determination unit 6; an attach/detach detection unit 7; a control unit 8; and a battery unit 10.

As shown in FIG. 1, the battery pack 1 is configured to be attached to and detached from an electric-powered work vehicle E. Also, the battery unit 10 is configured to be able to supply electric power to the electric-powered work vehicle E. In the present embodiment, the electric-powered work vehicle E is an electric-powered passenger mover.

Thus, the battery pack monitoring system A includes the battery pack 1, which includes the battery unit 10 capable of supplying electric power to the electric-powered work vehicle E and can be attached to or detached from the electric-powered work vehicle E.

The electric-powered work vehicle E includes traveling devices T and a mower M. The traveling devices T and the mower M are driven with the electric power supplied from the battery unit 10. Also, the electric-powered work vehicle E can travel with the traveling devices T, and can perform mowing work using the mower M.
Configuration Relating to Detection Mechanism The attach/detach detection unit 7 detects whether or not the battery pack 1 is attached to the electric-powered work vehicle E. If it is detected by the attach/detach detection unit 7 that the battery pack 1 is not attached to the electric-powered work vehicle E, the detection mechanism 2 detects the state inside the battery pack 1 over time.

Note that the present invention is not limited to this, and the detection mechanism 2 may be configured to detect the state of the environment surrounding the battery pack 1.

Thus, the battery pack monitoring system A includes the detection mechanism 2 that detects the state inside the battery pack 1 or the state of the environment surrounding the battery pack 1 with the battery pack 1 detached from the electric-powered work vehicle E.

The detection mechanism 2 is controlled by the control unit 8.

Furthermore, as shown in FIG. 2, the detection mechanism 2 includes a temperature sensor 21 and a humidity sensor 22. The temperature sensor 21 detects, as the state inside the battery pack 1, the temperature inside the battery pack 1. Furthermore, the humidity sensor 22 detects, as the state inside the battery pack 1, the humidity inside the battery pack 1.

Note that the present invention is not limited to this, and the temperature sensor 21 may be configured to detect, as the state of the environment surrounding the battery pack 1, the temperature of the environment surrounding the battery pack 1. Furthermore, the humidity sensor 22 may be configured to detect, as the state of the environment surrounding the battery pack 1, the humidity of the environment surrounding the battery pack 1.

Thus, the detection mechanism 2 includes the temperature sensor 21 that detects the temperature inside the battery pack 1 or the temperature of the environment surrounding the battery pack 1. The detection mechanism 2 further includes the humidity sensor 22 that detects the humidity inside the battery pack 1 or the humidity of the environment surrounding the battery pack 1.

Furthermore, as shown in FIG. 2, the detection mechanism power supply 3 is configured to be able to supply electric power to the detection mechanism 2. The detection mechanism power supply 3 is separate from the battery unit 10. Also, the detection mechanism 2 is driven with the electric power supplied from the detection mechanism power supply 3.

Thus, the battery pack monitoring system A includes the detection mechanism power supply 3 capable of supplying electric power to the detection mechanism 2. Also, the detection mechanism power supply 3 is separate from the battery unit 10.

Note that in the present embodiment, the detection mechanism power supply 3 is constituted by a solar battery. However, the present invention is not limited to this, and the detection mechanism power supply 3 may be constituted by a charging-type battery, or the like.

Furthermore, as shown in FIG. 2, the temperature detected by the temperature sensor 21 is transmitted to the determination unit 6. Also, the humidity detected by the humidity sensor 22 is transmitted to the determination unit 6.
Configuration of Determination Unit The determination unit 6 includes a high temperature determination unit 61, a low temperature determination unit 62, and a high humidity determination unit 63.

The high temperature determination unit 61 determines, based on the temperature received from the temperature sensor 21, whether or not the temperature inside the battery pack 1 is equal to or greater than a predetermined first temperature T1.

Note that the present invention is not limited to this, and the high temperature determination unit 61 may be configured to determine, based on the temperature received from the temperature sensor 21, whether or not the temperature of the environment surrounding the battery pack 1 is equal to or greater than the predetermined first temperature T1.

If it is determined that the temperature inside the battery pack 1 is equal to or greater than the predetermined first temperature T1, the high temperature determination unit 61 determines, based on the temperature received from the temperature sensor 21, whether or not a period in which the temperature inside the battery pack 1 is continuously equal to or greater than the predetermined first temperature T1 has reached a predetermined first period ti1.

Note that the present invention is not limited to this, and the high temperature determination unit 61 may be configured to determine, based on the temperature received from the temperature sensor 21, whether or not a period in which the temperature of the environment surrounding the battery pack 1 is continuously equal to or greater than the predetermined first temperature T1 has reached the predetermined first period ti1.

Thus, the battery pack monitoring system A includes the high temperature determination unit 61, which determines whether or not a period in which the temperature inside the battery pack 1 or the temperature of the environment surrounding the battery pack 1 is continuously equal to or greater than the predetermined first temperature T1 has reached the predetermined first period ti1 based on the temperature detected by the temperature sensor 21.

The result of the determination performed by the high temperature determination unit 61 is transmitted to the notification signal output unit 4.

The low temperature determination unit 62 determines, based on the temperature received from the temperature sensor 21, whether or not the temperature inside the battery pack 1 is equal to or lower than a predetermined second temperature T2.

Note that the present invention is not limited to this, and the low temperature determination unit 62 may be configured to determine, based on the temperature received from the temperature sensor 21, whether or not the temperature of the environment surrounding the battery pack 1 is equal to or lower than the predetermined second temperature T2.

If it is determined that the temperature inside the battery pack 1 is equal to or lower than the predetermined second temperature T2, the low temperature determination unit 62 determines, based on the temperature received from the temperature sensor 21, whether or not a period in which the temperature inside the battery pack 1 is continuously equal to or lower than the predetermined second temperature T2 has reached a predetermined second period ti2.

Note that the present invention is not limited to this, and the low temperature determination unit 62 may be configured to determine, based on the temperature received from the temperature sensor 21, whether or not a period in which the temperature of the environment surrounding the battery pack 1 is continuously equal to or lower than the predetermined second temperature T2 has reached the predetermined second period ti2.

Thus, the battery pack monitoring system A includes the low temperature determination unit 62, which determines whether or not a period in which the temperature inside the battery pack 1 or the temperature of the environment surrounding the battery pack 1 is continuously equal to or lower than the predetermined second temperature T2 has reached the predetermined second period ti2 based on the temperature detected by the temperature sensor 21.

The result of the determination performed by the low temperature determination unit 62 is transmitted to the notification signal output unit 4.

The high humidity determination unit 63 determines, based on the humidity received from the humidity sensor 22, whether or not the humidity inside the battery pack 1 is equal to or greater than a predetermined first humidity H1.

Note that the present invention is not limited to this, and the high humidity determination unit 63 may be configured to determine, based on the humidity received from the humidity sensor 22, whether or not the humidity of the environment surrounding the battery pack 1 is equal to or greater than the predetermined first humidity H1.

If it is determined that the humidity inside the battery pack 1 is equal to or greater than the predetermined first humidity H1, the high humidity determination unit 63 determines, based on the humidity received from the humidity sensor 22, whether or not a period in which the humidity inside the battery pack 1 is continuously equal to or greater than the predetermined first humidity H1 has reached a predetermined third period ti3.

Note that the present invention is not limited to this, and the high humidity determination unit 63 may be configured to determine, based on the humidity received from the humidity sensor 22, whether or not a period in which the humidity of the environment surrounding the battery pack 1 is continuously equal to or greater than the predetermined first humidity H1 has reached the predetermined third period ti3.

Thus, the battery pack monitoring system A includes the high humidity determination unit 63, which determines whether or not a period in which the humidity inside the battery pack 1 or the humidity of the environment surrounding the battery pack 1 is continuously equal to or greater than the predetermined first humidity H1 has reached the predetermined third period ti3 based on the humidity detected by the humidity sensor 22.

The result of the determination performed by the high humidity determination unit 63 is transmitted to the notification signal output unit 4.

Configuration of Notification Signal Output Unit

The notification signal output unit 4 is configured to output a notification signal, based on the determination results received from the high temperature determination unit 61, the low temperature determination unit 62, and the high humidity determination unit 63.

More specifically, the notification signal output unit 4 outputs a notification signal if it is determined by the high temperature determination unit 61 that a period in which the temperature inside the battery pack 1 is continuously equal to or greater than the first temperature T1 has reached the first period ti1.

Note that the present invention is not limited to this, and the notification signal output unit 4 may be configured to output a notification signal if it is determined by the high temperature determination unit 61 that a period in which the temperature of the environment surrounding the battery pack 1 is continuously equal to or greater than the predetermined first temperature T1 has reached the predetermined first period ti1.

Thus, in the battery pack monitoring system A, the notification signal output unit 4 outputs a notification signal if it is determined by the high temperature determination unit 61 that a period in which the temperature inside the battery pack 1 or the temperature of the environment surrounding the battery pack 1 is continuously equal to or greater than the first temperature T1 has reached the first period ti1.

Also, the notification signal output unit 4 outputs a notification signal if it is determined by the low temperature determination unit 62 that a period in which the temperature inside the battery pack 1 is continuously equal to or lower than the second temperature T2 has reached the second period ti2.

Note that the present invention is not limited to this, and the notification signal output unit 4 may be configured to output a notification signal if it is determined by the low temperature determination unit 62 that a period in which the temperature of the environment surrounding the battery pack 1 is continuously equal to or lower than the predetermined second temperature T2 has reached the predetermined second period ti2.

Thus, in the battery pack monitoring system A, the notification signal output unit 4 outputs a notification signal if it is determined by the low temperature determination unit 62 that a period in which the temperature inside the battery pack 1 or the temperature of the environment surrounding the battery pack 1 is continuously equal to or lower than the second temperature T2 has reached the second period ti2.

Furthermore, in this manner, the notification signal output unit 4 outputs a notification signal based on the temperature detected by the temperature sensor 21.

Also, the notification signal output unit 4 outputs a notification signal if it is determined by the high humidity determination unit 63 that a period in which the humidity inside the battery pack 1 is continuously equal to or greater than the first humidity H1 has reached the third period ti3.

Note that the present invention is not limited to this, and the notification signal output unit 4 may be configured to output a notification signal if it is determined by the high humidity determination unit 63 that a period in which the humidity of the environment surrounding the battery pack 1 is continuously equal to or greater than the predetermined first humidity H1 has reached the predetermined third period ti3.

Thus, in the battery pack monitoring system A, the notification signal output unit 4 outputs a notification signal if it is determined by the high humidity determination unit 63 that a period in which the humidity inside the battery pack 1 or the humidity of the environment surrounding the battery pack 1 is continuously equal to or greater than the first humidity H1 has reached the third period ti3.

Furthermore, in this manner, the notification signal output unit 4 outputs a notification signal based on the humidity detected by the humidity sensor 22.

As described above, the battery pack monitoring system A includes the notification signal output unit 4, which outputs a notification signal based on a result of the detection performed by the detection mechanism 2.

As shown in FIG. 2, the notification signal output from the notification signal output unit 4 is transmitted to the display unit 5.

Configuration of Display Unit

The display unit 5 is configured to perform notification based on the notification signal received from the notification signal output unit 4.

Thus, the battery pack monitoring system A includes a notification device that performs notification based on a notification signal output from the notification signal output unit 4. In the present embodiment, the notification device is the display unit 5 included in the battery pack 1.

Monitoring Routine

Figure 3:
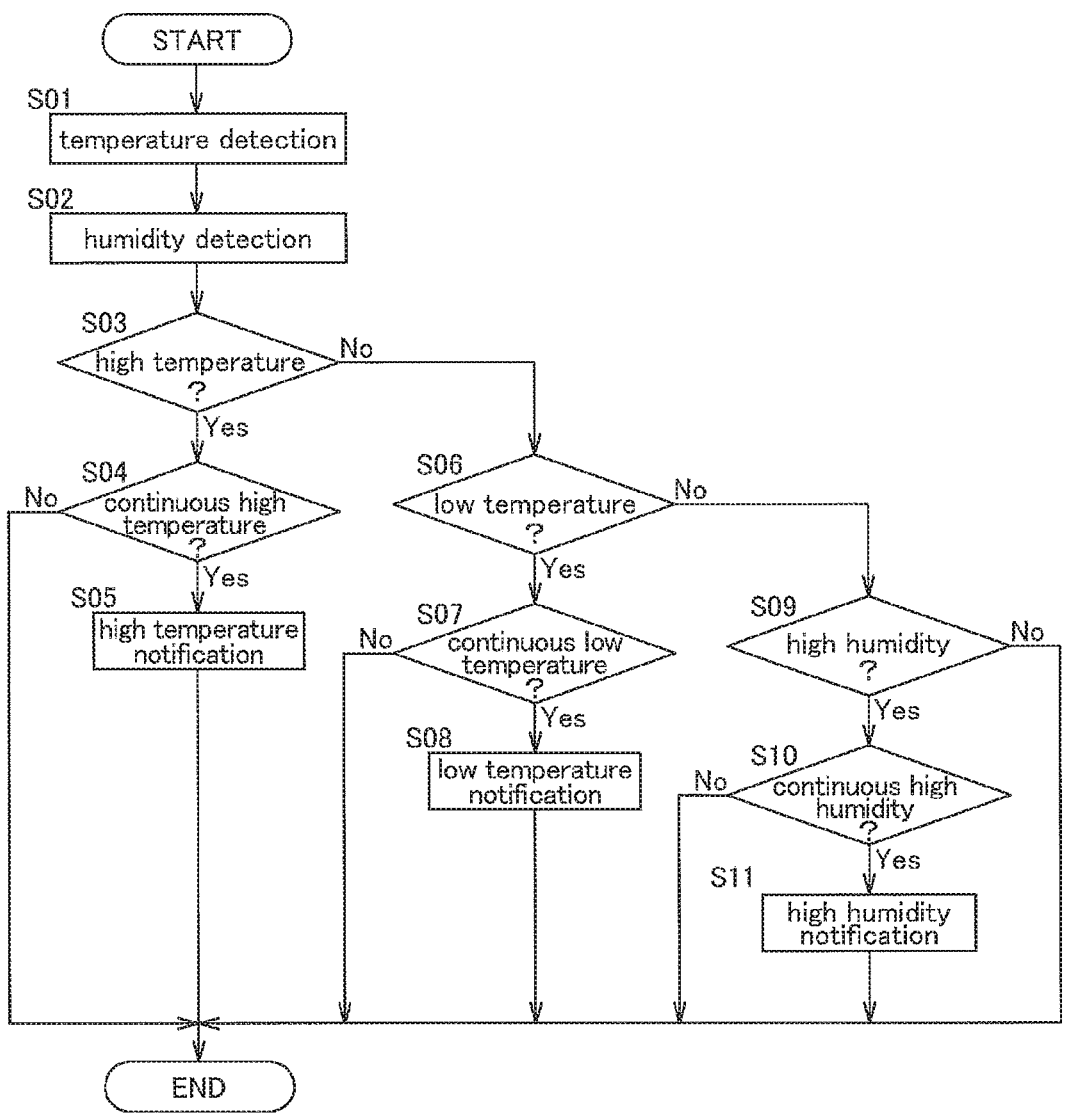
FIG. 3 is a flowchart of a monitoring routine.

If it is detected by the attach/detach detection unit 7 that the battery pack 1 is in a state of not being attached to the electric-powered work vehicle E, a monitoring routine shown in FIG. 3 is executed in every predetermined fourth period ti4. Note that the monitoring routine is stored in the control unit 8 shown in FIG. 2. Hereinafter, the monitoring routine shown in FIG. 3 will be described.

Figure 4:
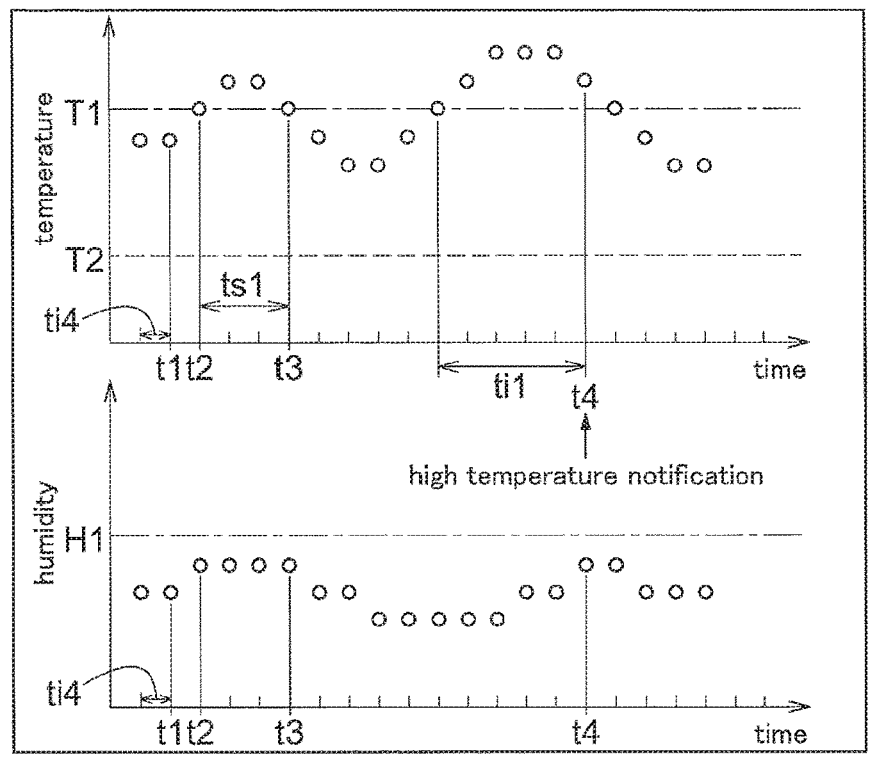
FIG. 4 is a diagram illustrating an example of changes in temperature and humidity.

The following will first describe processing that is performed at time t1 in a case where the temperature detected by the temperature sensor 21 and the humidity detected by the humidity sensor 22 change as shown in FIG. 4.

Time t1

When the monitoring routine is started, processing in step S01 is first executed. In step S01, the temperature sensor 21 detects the temperature inside the battery pack 1. Then, the temperature detected by the temperature sensor 21 is transmitted to the determination unit 6. Then, the procedure moves to step S02.

In step S02, the humidity sensor 22 detects the humidity inside the battery pack 1. Then, the humidity detected by the humidity sensor 22 is transmitted to the determination unit 6. Then, the procedure moves to step S03.

In step S03, the high temperature determination unit 61 determines, based on the temperature received from the temperature sensor 21, whether or not the temperature inside the battery pack 1 is equal to or greater than the first temperature T1.

As shown in FIG. 4, at time t1, the temperature detected by the temperature sensor 21 is lower than the first temperature T1. Accordingly, the determination in step S03 results in "No", and the procedure moves to step S06.

In step S06, the low temperature determination unit 62 determines, based on the temperature received from the temperature sensor 21, whether or not the temperature inside the battery pack 1 is equal to or lower than the second temperature T2.

As shown in FIG. 4, at time t1, the temperature detected by the temperature sensor 21 is higher than the second temperature T2. Accordingly, the determination in step S06 results in "No", and the procedure moves to step S09.

In step S09, the high humidity determination unit 63 determines, based on the humidity received from the humidity sensor 22, whether or not the humidity inside the battery pack 1 is equal to or greater than the first humidity H1.

As shown in FIG. 4, at time t1, the humidity detected by the humidity sensor 22 is lower than the first humidity H1. Accordingly, the determination in step S09 results in "No", and the monitoring routine is complete once.

Time t2

The following will describe processing that is performed at time t2 in the case where the temperature detected by the temperature sensor 21 and the humidity detected by the humidity sensor 22 change as shown in FIG. 4. Note that time t2 is a point in time when the fourth period ti4 has elapsed from time t1.

The flow of the processing that is performed at time t2 is the same as the processing that is performed at time t1 until step S02. Accordingly, the description below will be given starting from a point in time when the procedure has moved to step S03.

In step S03, the high temperature determination unit 61 determines, based on the temperature received from the temperature sensor 21, whether or not the temperature inside the battery pack 1 is equal to or greater than the first temperature T1.

As shown in FIG. 4, at time t2, the temperature detected by the temperature sensor 21 is equal to the first temperature T1. Accordingly, the determination in step S03 results in "Yes", and the procedure moves to step S04.

In step S04, the high temperature determination unit 61 determines, based on the temperature received from the temperature sensor 21, whether or not a period in which the temperature inside the battery pack 1 is continuously equal to or greater than the first temperature T1 has reached the first period ti1.

As shown in FIG. 4, time t2 is a point in time immediately after the temperature detected by the temperature sensor 21 has reached the first temperature T1. Accordingly, the determination in step S04 results in "No", and the monitoring routine is complete once.

Time t3

The following will describe processing that is performed at time t3 in the case where the temperature detected by the temperature sensor 21 and humidity detected by the humidity sensor 22 change as shown in FIG. 4.

The flow of the processing that is performed at time t3 is the same as the processing that is performed at time t2 until the determination in step S03 results in "Yes". Accordingly, the description below will be given starting from a point in time when the procedure has moved to step S04.

In step S04, the high temperature determination unit 61 determines, based on the temperature received from the temperature sensor 21, whether or not a period in which the temperature inside the battery pack 1 is continuously equal to or greater than the first temperature T1 has reached the first period ti1.

As shown in FIG. 4, at time t3, the period in which the temperature detected by the temperature sensor 21 is continuously equal to or greater than the first temperature T1 has reached a period ts1. Note here that the period ts1 is assumed to be shorter than the first period ti1.

At this time, the high temperature determination unit 61 determines, based on the temperature received from the temperature sensor 21, that the period in which the temperature inside the battery pack 1 is continuously equal to or greater than the first temperature T1 has not reached the first period ti1. Accordingly, the determination in step S04 results in "No", and the monitoring routine is complete once.

Time t4

The following will describe processing that is performed at time t4 in the case where the temperature detected by the temperature sensor 21 and the humidity detected by the humidity sensor 22 change as shown in FIG. 4.

The flow of the processing that is performed at time t4 is the same as the processing that is performed at time t2 until the determination in step S03 results in "Yes". Accordingly, the description below will be given starting from a point in time when the procedure has moved to step S04.

In step S04, the high temperature determination unit 61 determines, based on the temperature received from the temperature sensor 21, whether or not a period in which the temperature inside the battery pack 1 is continuously equal to or greater than the first temperature T1 has reached the first period ti1.

As shown in FIG. 4, at time t4, the period in which the temperature detected by the temperature sensor 21 is continuously equal to or greater than the first temperature T1 has reached the first period ti1. Accordingly, the determination in step S04 results in "Yes", and the procedure moves to step S05.

In step S05, the notification signal output unit 4 outputs a notification signal. Then, the display unit 5 displays, based on the notification signal received from the notification signal output unit 4, a warning to notify the worker that the area in which the battery pack 1 is stored has a relatively high temperature and is not appropriate as a storage area. Then, the monitoring routine is complete once.

Note that, as described above, the monitoring routine shown in FIG. 3 is executed in every fourth period ti4. Also, as shown in FIG. 3, each time the monitoring routine is executed, the temperature inside the battery pack 1 is detected by the temperature sensor 21 in step S01, and the humidity inside the battery pack 1 is detected by the humidity sensor 22 in step S02. In other words, the detection mechanism 2 detects the state inside the battery pack 1 in every fourth period ti4.

As described above, the detection mechanism 2 may be configured to detect the state of the environment surrounding the battery pack 1. In other words, the detection mechanism 2 may be configured to detect the state of the environment surrounding the battery pack 1 in every fourth period ti4.

Thus, the detection mechanism 2 detects the state inside the battery pack 1 or the state of the environment surrounding the battery pack 1 in every predetermined fourth period ti4.

Time t5

Figure 5:
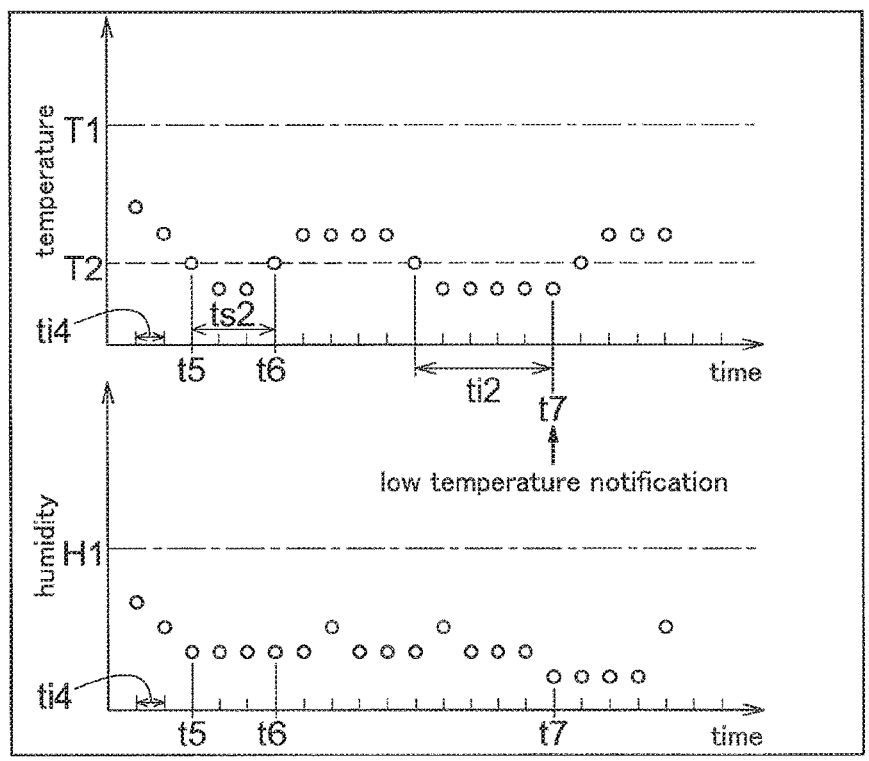
FIG. 5 is a diagram illustrating an example of changes in temperature and humidity.

The following will describe processing that is performed at time t5 in a case where the temperature detected by the temperature sensor 21 and the humidity detected by the humidity sensor 22 change as shown in FIG. 5.

The flow of the processing that is performed at time t5 is the same as the processing that is performed at time t1 until the determination in step S03 results in "No". Accordingly, the description below will be given starting from a point in time when the procedure has moved to step S06.

In step S06, the low temperature determination unit 62 determines, based on the temperature received from the temperature sensor 21, whether or not the temperature inside the battery pack 1 is equal to or lower than the second temperature T2.

As shown in FIG. 5, at time t5, the temperature detected by the temperature sensor 21 is equal to the second temperature T2. Accordingly, the determination in step S06 results in "Yes", and the procedure moves to step S07.

In step S07, the low temperature determination unit 62 determines, based on the temperature received from the temperature sensor 21, whether or not a period in which the temperature inside the battery pack 1 is continuously equal to or lower than the second temperature T2 has reached the second period ti2.

As shown in FIG. 5, time t5 is a point in time immediately after the temperature detected by the temperature sensor 21 has reached the second temperature T2. Accordingly, the determination in step S07 results in "No", and the monitoring routine is complete once.

Time t6

The following will describe processing that is performed at time t6 in the case where the temperature detected by the temperature sensor 21 and the humidity detected by the humidity sensor 22 change as shown in FIG. 5.

The flow of the processing that is performed at time t6 is the same as the processing that is performed at time t5 until the determination in step S06 results in "Yes". Accordingly, the description below will be given starting from a point in time when the procedure has moved to step S07.

In step S07, the low temperature determination unit 62 determines, based on the temperature received from the temperature sensor 21, whether or not a period in which the temperature inside the battery pack 1 is continuously equal to or lower than the second temperature T2 has reached the second period ti2.

As shown in FIG. 5, at time t6, the period in which the temperature detected by the temperature sensor 21 is continuously equal to or lower than the second temperature T2 has reached a period ts2. Note here that the period ts2 is assumed to be shorter than the second period ti2.

At this time, the low temperature determination unit 62 determines, based on the temperature received from the temperature sensor 21, that the period in which the temperature inside the battery pack 1 is continuously equal to or lower than the second temperature T2 has not reached the second period ti2. Accordingly, the determination in step S07 results in "No", and the monitoring routine is complete once.

Time t7

The following will describe processing that is performed at time t7 in the case where the temperature detected by the temperature sensor 21 and the humidity detected by the humidity sensor 22 change as shown in FIG. 5.

The flow of the processing that is performed at time t7 is the same as the processing that is performed at time t5 until the determination in step S06 results in "Yes". Accordingly, the description below will be given starting from a point in time when the procedure has moved to step S07.

In step S07, the low temperature determination unit 62 determines, based on the temperature received from the temperature sensor 21, whether or not a period in which the temperature inside the battery pack 1 is continuously equal to or lower than the second temperature T2 has reached the second period ti2.

As shown in FIG. 5, at time t7, the period in which the temperature detected by the temperature sensor 21 is continuously equal to or lower than the second temperature T2 has reached the second period ti2. Accordingly, the determination in step S07 results in "Yes", and the procedure moves to step S08.

In step S08, the notification signal output unit 4 outputs a notification signal. Then, the display unit 5 displays, based on the notification signal received from the notification signal output unit 4, a warning to notify the worker that the area in which the battery pack 1 is stored has a relatively low temperature and is not appropriate as a storage area. Then, the monitoring routine is complete once.

Time t8

Figure 6:
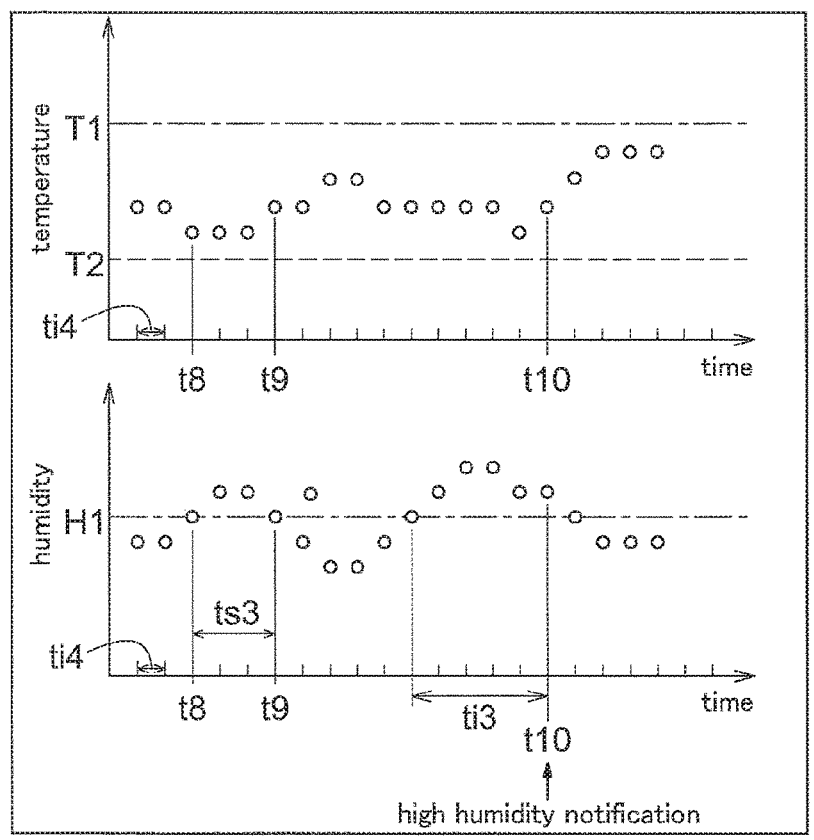
FIG. 6 is a diagram illustrating an example of changes in temperature and humidity.

The following will describe processing that is performed at time t8 in a case where the temperature detected by the temperature sensor 21 and the humidity detected by the humidity sensor 22 change as shown in FIG. 6.

The flow of the processing that is performed at time t8 is the same as the processing that is performed at time t1 until the determination in step S06 results in "No". Accordingly, the description below will be given starting from a point in time when the procedure has moved to step S09.

In step S09, the high humidity determination unit 63 determines, based on the humidity received from the humidity sensor 22, whether or not the humidity inside the battery pack 1 is equal to or greater than the first humidity H1.

As shown in FIG. 6, at time t8, the humidity detected by the humidity sensor 22 is equal to the first humidity H1. Accordingly, the determination in step S09 results in "Yes", and the procedure moves to step S10.

In step S10, the high humidity determination unit 63 determines, based on the humidity received from the humidity sensor 22, whether or not a period in which the humidity inside the battery pack 1 is continuously equal to or greater than the first humidity H1 has reached the third period ti3.

As shown in FIG. 6, time t8 is a point in time immediately after the humidity detected by the humidity sensor 22 has reached the first humidity H1. Accordingly, the determination in step S10 results in "No", and the monitoring routine is complete once.

Time t9

The following will describe processing that is performed at time t9 in the case where the temperature detected by the temperature sensor 21 and the humidity detected by the humidity sensor 22 change as shown in FIG. 6.

The flow of the processing that is performed at time t9 is the same as the processing that is performed at time t8 until the determination in step S09 results in "Yes". Accordingly, the description below will be given starting from a point in time when the procedure has moved to step S10.

In step S10, the high humidity determination unit 63 determines, based on the humidity received from the humidity sensor 22, whether or not a period in which the humidity inside the battery pack 1 is continuously equal to or greater than the first humidity H1 has reached the third period ti3.

As shown in FIG. 6, at time t9, the period in which the humidity detected by the humidity sensor 22 is continuously equal to or greater than the first humidity H1 has reached a period ts3. Note here that the period ts3 is assumed to be shorter than the third period ti3.

At this time, the high humidity determination unit 63 determines, based on the humidity received from the humidity sensor 22, that the period in which the humidity inside the battery pack 1 is continuously equal to or greater than the first humidity H1 has not reached the third period ti3. Accordingly, the determination in step S10 results in "No", and the monitoring routine is complete once.

Time t10

The following will describe processing that is performed at time t10 in the case where the temperature detected by the temperature sensor 21 and the humidity detected by the humidity sensor 22 change as shown in FIG. 6.

The flow of the processing that is performed at time t10 is the same as the processing that is performed at time t8 until the determination in step S09 results in "Yes". Accordingly, the description below will be given starting from a point in time when the procedure has moved to step S10.

In step S10, the high humidity determination unit 63 determines, based on the humidity received from the humidity sensor 22, whether or not a period in which the humidity inside the battery pack 1 is continuously equal to or greater than the first humidity H1 has reached the third period ti3.

As shown in FIG. 6, at time t10, the period in which the humidity detected by the humidity sensor 22 is continuously equal to or greater than the first humidity H1 has reached the third period ti3. Accordingly, the determination in step S10 results in "Yes", and the procedure moves to step S11.

In step S11, the notification signal output unit 4 outputs a notification signal. Then, the display unit 5 displays, based on the notification signal received from the notification signal output unit 4, a warning to notify the worker that the area in which the battery pack 1 is stored has relatively high humidity and is not appropriate as a storage area. Then, the monitoring routine is complete once.

With the above-described configuration, it is possible to realize a configuration in which, if the environment in which the battery pack 1 is stored is inappropriate, the detection mechanism 2 detects this fact. Also, notification is performed based on a result of the detection performed by the detection mechanism 2 to notify a worker of the fact that the environment in which the battery pack 1 is stored is inappropriate.

Accordingly, with the above-described configuration, it is possible to realize the battery pack monitoring system A that can notify a worker if the environment in which the battery pack 1 is stored is inappropriate.

First Modification

In the foregoing embodiment, a notification signal output from the notification signal output unit 4 is transmitted to the display unit 5. Then, the display unit 5 performs notification based on the notification signal received from the notification signal output unit 4.

However, the present invention is not limited to this. The following will describe a first modification according to the present invention, focusing on differences from the foregoing embodiment. The configurations except for those described below are the same as in the foregoing embodiment. Furthermore, the same reference numerals are given to the same configurations as in the foregoing embodiment.

Figure 7:
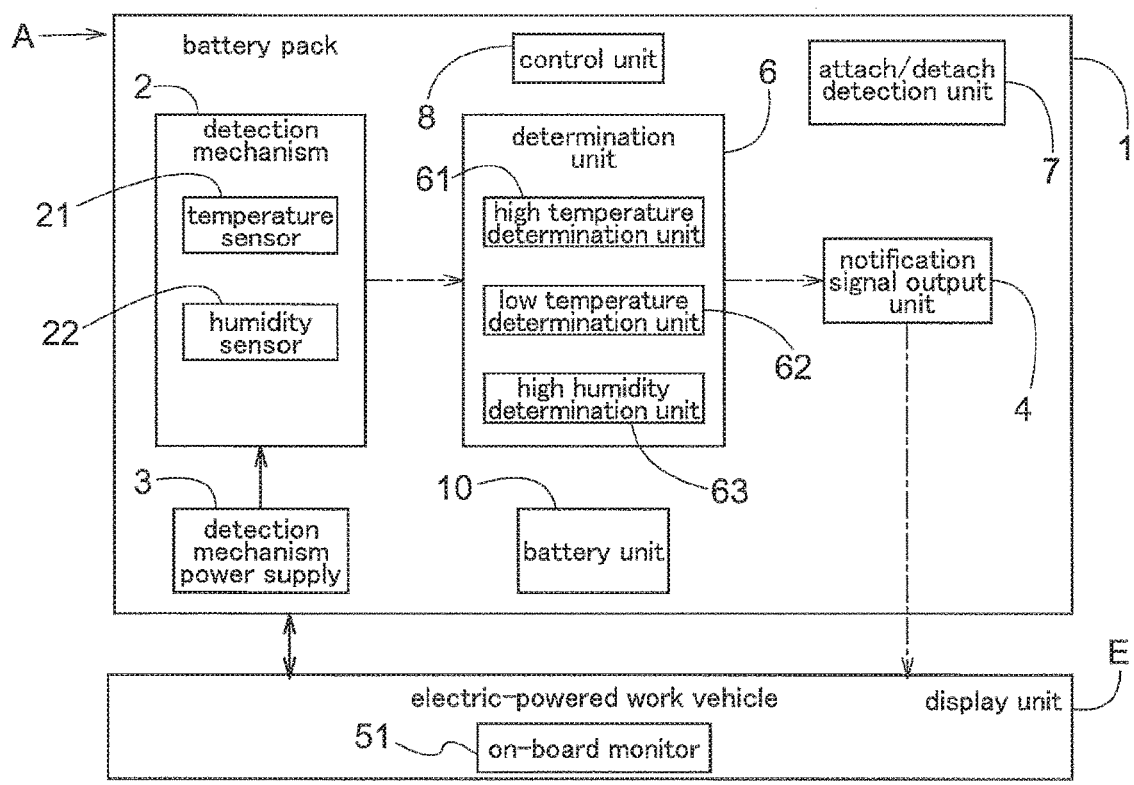
FIG. 7 is a block diagram illustrating a configuration of a battery pack monitoring system according to a first modification.

FIG. 7 is a diagram showing a configuration of the battery pack monitoring system A according to the first modification of the present invention. As shown in FIG. 7, in the first modification, a notification signal output from the notification signal output unit 4 is transmitted to an on-board monitor 51 included in the electric-powered work vehicle E. Then, the on-board monitor 51 performs notification based on the notification signal received from the notification signal output unit 4.

As described above, the battery pack monitoring system A according to the first modification of the present invention includes a notification device that performs notification based on a notification signal output from the notification signal output unit 4. Also, in the first modification, the notification device is the on-board monitor 51 of the electric-powered work vehicle E.

More specifically, a notification signal output from the notification signal output unit 4 is transmitted to the on-board monitor 51 when it is detected by the attach/detach detection unit 7 that the battery pack 1 is attached to the electric-powered work vehicle E. With this, the on-board monitor 51 displays, based on the notification signal, a warning to notify the worker that the battery pack 1 has been stored in an inappropriate environment.

In other words, the notification is performed by the on-board monitor 51 upon the battery pack 1 being attached to the electric-powered work vehicle E.

As described above, in the first modification, upon the battery pack 1 being attached to the electric-powered work vehicle E, the on-board monitor 51 performs notification based on a notification signal output from the notification signal output unit 4.

Second Modification

In the foregoing embodiment, a notification signal output from the notification signal output unit 4 is transmitted to the display unit 5. Then, the display unit 5 performs notification based on the notification signal received from the notification signal output unit 4.

However, the present invention is not limited to this. The following will describe a second modification according to the present invention, focusing on differences from the foregoing embodiment. The configurations except for those described below are the same as in the foregoing embodiment. Furthermore, the same reference numerals are given to the same configurations as in the foregoing embodiment.

Figure 8:
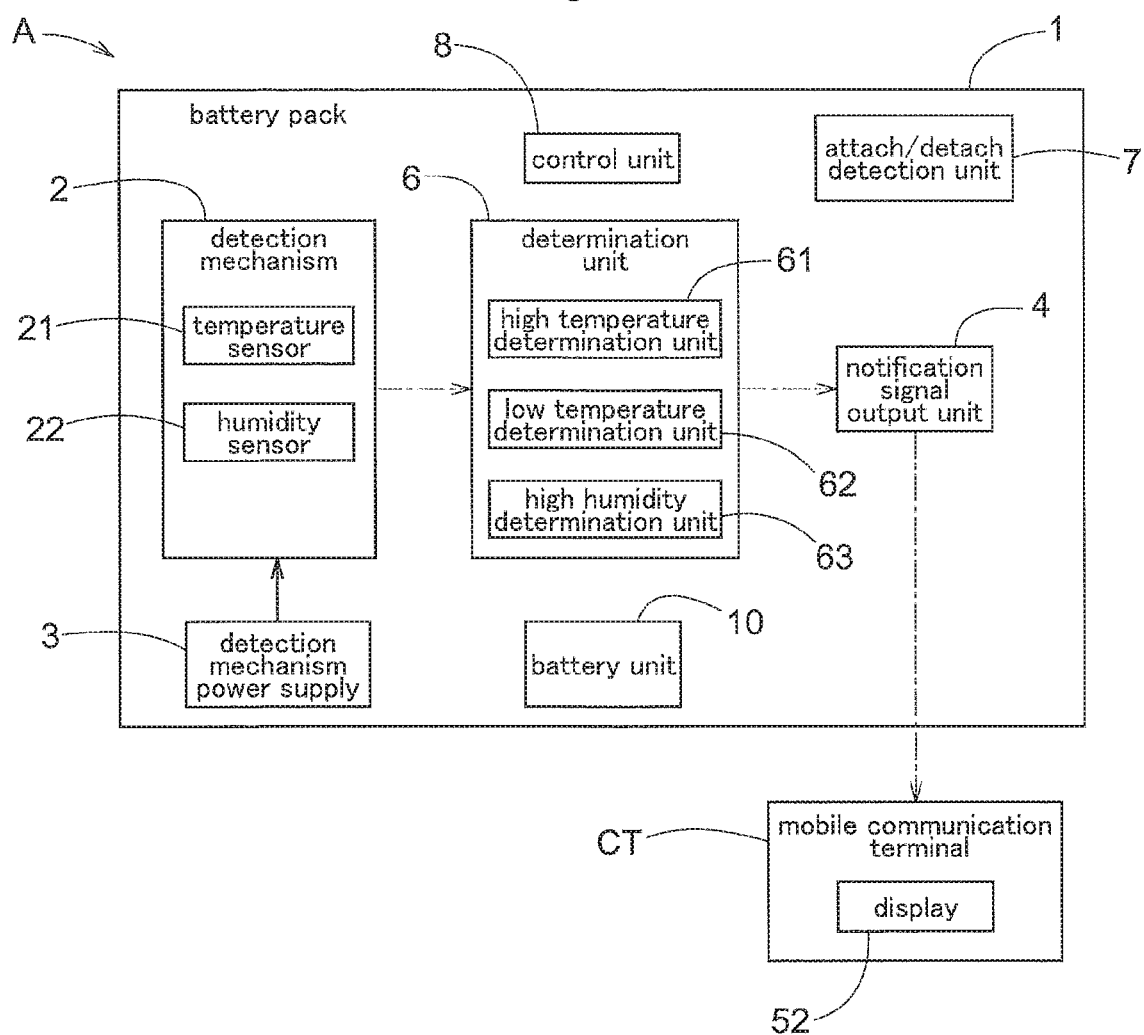
FIG. 8 is a block diagram illustrating a configuration of a battery pack monitoring system according to a second modification.

FIG. 8 is a diagram showing a configuration of the battery pack monitoring system A according to the second modification of the present invention. As shown in FIG. 8, the battery pack monitoring system A according to the second modification includes a mobile communication terminal CT capable of performing wireless communication. A notification signal output from the notification signal output unit 4 is transmitted to a display 52 (corresponding to the "notification device" according to the present invention) included in the mobile communication terminal CT. Then, the display 52 performs notification based on the notification signal received from the notification signal output unit 4.

As described above, the battery pack monitoring system A according to the second modification of the present invention includes the notification device that performs notification based on a notification signal output from the notification signal output unit 4. Also, in the second modification, the mobile communication terminal CT includes the notification device.

More specifically, a notification signal output from the notification signal output unit 4 is transmitted to the display 52 of the mobile communication terminal CT using wireless communication. With this, the display 52 displays, based on the notification signal, a warning to notify the worker that the battery pack 1 is stored in an inappropriate environment.

Other Embodiments (1) The detection mechanism 2 may be provided on the outside of the battery pack 1.

(2) The detection mechanism power supply 3 may be provided on the outside of the battery pack 1.

(3) The notification signal output unit 4 may be provided on the outside of the battery pack 1. For example, the notification signal output unit 4 may be provided on the electric-powered work vehicle E.

(4) The determination unit 6 may be provided on the outside of the battery pack 1. For example, the determination unit 6 may be provided on the electric-powered work vehicle E.

(5) The notification performed by the notification device does not need to be visual notification. For example, the notification device may be configured to generate sound or vibration to perform notification.

(6) The detection mechanism 2 may be configured to detect the state inside the battery pack 1 or the state of the environment surrounding the battery pack 1 continuously, instead of in every predetermined period of time.

(7) The battery pack monitoring system A may be configured such that the notification signal output unit 4 outputs a notification signal at a point in time when the temperature detected by the temperature sensor 21 has become the first temperature T1 or greater.

(8) The battery pack monitoring system A may also be configured such that the notification signal output unit 4 outputs a notification signal at a point in time when the temperature detected by the temperature sensor 21 has become the second temperature T2 or lower.

(9) The battery pack monitoring system A may also be configured such that the notification signal output unit 4 outputs a notification signal at a point in time when the humidity detected by the humidity sensor 22 has become the first humidity H1 or greater.

(10) The detection mechanism 2 does not necessarily include the temperature sensor 21.

(11) The detection mechanism 2 does not necessarily include the humidity sensor 22.

(12) In the foregoing embodiments, the electric-powered passenger mover is exemplified as the electric-powered work vehicle, but the present invention is not limited to this. The battery pack monitoring system is also applicable to other type of work vehicle on which a battery pack is installed.

What is claimed is:

1. A battery pack monitoring system comprising:
   a battery pack that includes a battery unit capable of supplying electric power to an electric-powered work vehicle, and can be attached to and detached from the electric-powered work vehicle;
   a detection mechanism configured to detect a state inside the battery pack or a state of an environment surrounding the battery pack with the battery pack detached from the electric-powered work vehicle;
   a detection mechanism power supply that is separate from the battery unit, and is capable of supplying electric power to the detection mechanism;
   a notification signal output unit configured to output a notification signal based on a result of the detection performed by the detection mechanism; and a notification device configured to perform notification based on the notification signal output by the notification signal output unit.

2. The battery pack monitoring system according to claim 1, wherein
the detection mechanism includes a temperature sensor configured to detect a temperature inside the battery pack or a temperature of the environment surrounding the battery pack, and
the notification signal output unit is configured to output the notification signal based on the temperature detected by the temperature sensor.

3. The battery pack monitoring system according to claim 2, further comprising:
a high temperature determination unit configured to determine, based on the temperature detected by the temperature sensor, whether or not a period in which the temperature inside the battery pack or the temperature of the environment surrounding the battery pack is continuously equal to or greater than a predetermined first temperature has reached a predetermined first period,
wherein the notification signal output unit is configured to output the notification signal if it is determined by the high temperature determination unit that the period in which the temperature inside the battery pack or the temperature of the environment surrounding the battery pack is continuously equal to or greater than the first temperature has reached the first period.

4. The battery pack monitoring system according to claim 2, further comprising:
a low temperature determination unit configured to determine, based on the temperature detected by the temperature sensor, whether or not a period in which the temperature inside the battery pack or the temperature of the environment surrounding the battery pack is continuously equal to or lower than a predetermined second temperature has reached a predetermined second period,
wherein the notification signal output unit is configured to output the notification signal if it is determined by the low temperature determination unit that the period in which the temperature inside the battery pack or the temperature of the environment surrounding the battery pack is continuously equal to or lower than the second temperature has reached the second period.

5. The battery pack monitoring system according to claim 1, wherein
the detection mechanism includes a humidity sensor configured to detect humidity inside the battery pack or humidity of the environment surrounding the battery pack, and
the notification signal output unit is configured to output the notification signal based on the humidity detected by the humidity sensor.

6. The battery pack monitoring system according to claim 5, further comprising:
a high humidity determination unit configured to determine, based on the humidity detected by the humidity sensor, whether or not a period in which the humidity inside the battery pack or the humidity of the environment surrounding the battery pack is continuously equal to or greater than a predetermined first humidity has reached a predetermined third period,
wherein the notification signal output unit is configured to output the notification signal if it is determined by the high humidity determination unit that the period in which the humidity inside the battery pack or the humidity of the environment surrounding the battery pack is continuously equal to or greater than the first humidity has reached the third period.

7. The battery pack monitoring system according to claim 1, wherein
the detection mechanism is configured to detect a state inside the battery pack or a state of the environment surrounding the battery pack in every predetermined fourth period.

8. The battery pack monitoring system according to claim 1, wherein
the notification device is a display unit provided on the battery pack.

9. The battery pack monitoring system according to claim 1, wherein
the notification device is an on-board monitor included in the electric-powered work vehicle, and
upon the battery pack being attached to the electric-powered work vehicle, the on-board monitor performs notification based on the notification signal output by the notification signal output unit.

10. The battery pack monitoring system according to claim 1, further comprising:
a mobile communication terminal capable of performing wireless communication,
wherein the mobile communication terminal includes the notification device.

* * * * *